Nov. 25, 1930.       H. PERLMUTTER       1,782,742

BODY SUSPENSION FOR BABY CARRIAGES

Filed July 25, 1927

INVENTOR.
Harry Perlmutter,
BY H. S. Woodward
ATTORNEY.

Patented Nov. 25, 1930

1,782,742

UNITED STATES PATENT OFFICE

HARRY PERLMUTTER, OF BROOKLYN, NEW YORK

BODY SUSPENSION FOR BABY CARRIAGES

Application filed July 25, 1927. Serial No. 208,199.

The invention relates to constructions in baby carriages, having for its object to provide a cushioning of the body against shock incident to movement of this carriage over uneven pavements or other surfaces, by which both lateral and vertical shocks will be readily absorbed. It has been a development in the art to so design the running gears as to permit the use of very small wheels, because of their low cost, and it is an advantage of my invention that this development is furthered, at the same time that no increase of expense for springs or other structure incident to elevating the body is involved. A further important aim of the invention is to reduce the cost of assembly of such devices, minimizing the points of attachment of the body to the frame or springs, as well as simplifying the nature of the connections between the body and its mounting.

A further aim is to provide a novel, specific form of mounting suitable to the end in view.

Additional objects, advantages and features of invention reside in the construction, arrangement, and combination of parts, as will be understood from the following description and accompanying drawings, wherein Figure 1 is a side elevation of a carriage constructed in accordance with my invention.

Figures 1, 2:
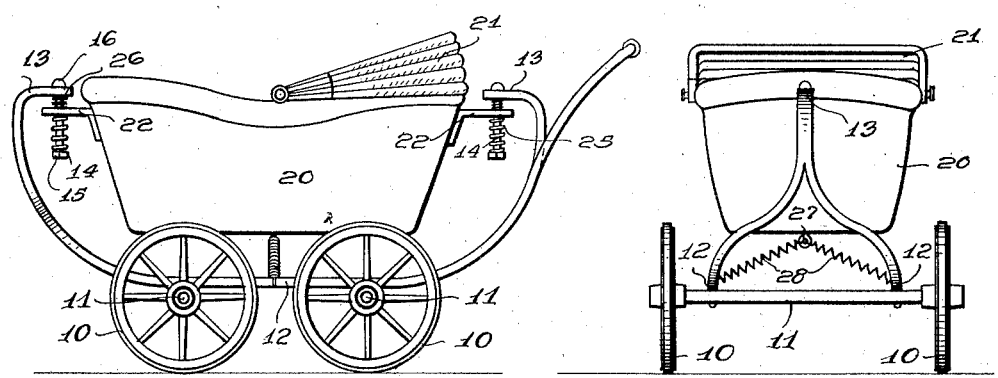
Figure 2 is a front view thereof.
Figure 3:
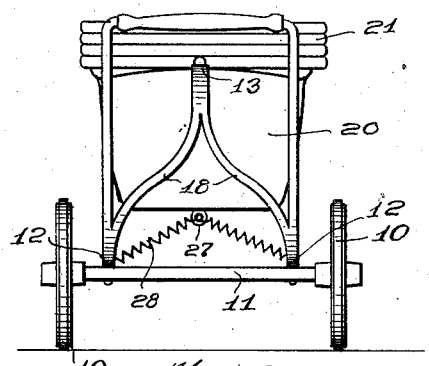
Figure 3 is a rear view of the carriage.
Figure 4:
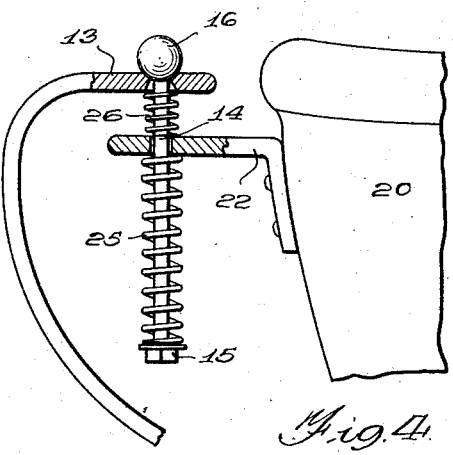
Figure 4 is a detail longitudinal sectional view of the body end and mounting.

There is illustrated a running gear comprising the usual wheels 10 supporting two axles 11 of conventional construction. Upon the axles 11 there are two longitudinally extending members 12 of the running gear frame. Between the axles, these members 12 are rectilinear in form and located closely adjacent the respective wheels. At their forward parts the members 12 converge toward each other and are curved upwardly, terminating in an inwardly projected bracket or hanger fitting 13 which comprises a swivel mounting for a bolt 14 hanging pendent therefrom and provided with a spring seat 15 at its lower part. The bolt is formed with a spherical head 16 set loosely in an opening in the fitting 13. At the rear of the running gear the members 12 are continued a distance rearwardly, and upwardly in parallel relation, having a handle bar attached to the rear extremities, by which the carriage may be propelled and manipulated in the customary way. Immediately behind the rear axle, extensions 18 from the side members 12 are projected convergently, upwardly, corresponding in form to the forwerd part of the members 12 as before described. They support likewise a forwardly extended bracket or hanger fitting 13 supporting a bolt 14 in the same manner as before described.

A carriage body 20 is illustrated, which may conform to conventional methods and design, and in the present instance the body is shown as provided with a hood 21. At both the rear and front end of the body a bracket 22 is provided, having a horizontal, longitudinal, outward extension which is apertured to initially aline with the bolt 14 thereadjacent and receive the same slidably and loosely. The outer end of the bracket laps the adjacent end of the hanger 13 for this purpose. A helical supporting spring 25 is confined between the under side of the bracket and the seat nut 15 at the lower end of the bolt, while over the bracket, between the bracket and the hanger and around the bolt a light cushion spring 26 is positioned. This serves to cushion the rebound of the body in case of abrupt recoil action of the spring 25. Intermediately of the length and width of the body at the bottom an eye bolt 27 is provided, from which respective springs 28 extend laterally and are hooked or otherwise engaged with the respective side members 12, whereby oscillation of the lower part of the body is yieldingly opposed, the springs being adapted to prevent oscillation beyond a predetermined maximum distance.

Figure 5:
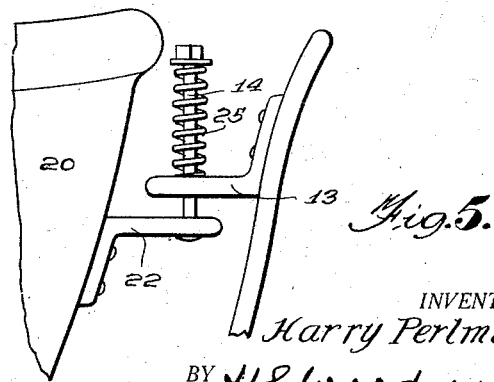
Figure 5 is a similar view of a modification of the mounting.

In Figure 5 a modification is shown, in which the same relative positions of the hanger and bracket as in Figure 1 are involved, but the bolt is extended upwardly instead of below the two, and the spring 25 is confined between the upper end of the bolt and the hanger. In this last construction, each body bracket is located near a horizontal line coincident with the center of gravity of the body, but in conjunction with the lateral springs 28 liability of upset of the body is obivated, and a peculiar rolling action of the body is obtainable by reason of the loose fit of the bolt in the hanger, and the location of the points of support close to the line through the center of gravity.

I claim:

In a baby carriage, a body, a running gear, a body bracket at each end of the body, a running gear bracket at each end of the running gear, a body-supporting bolt at each end of the carriage having universal pivotal relation with both brackets, being slidably engaged through one bracket, the other bracket having an apertured spherical bearing at the outer side, said bolt being engaged therethrough and having a spherical head set in the bearing, and a load-sustaining helical spring encircling the bolt under compression between one bracket and the bolt.

In testimony whereof I affix my signature.

HARRY PERLMUTTER.